June 4, 1940.  H. W. WYLIE  2,202,882
CONVEYER
Filed Aug. 20, 1937  2 Sheets-Sheet 1
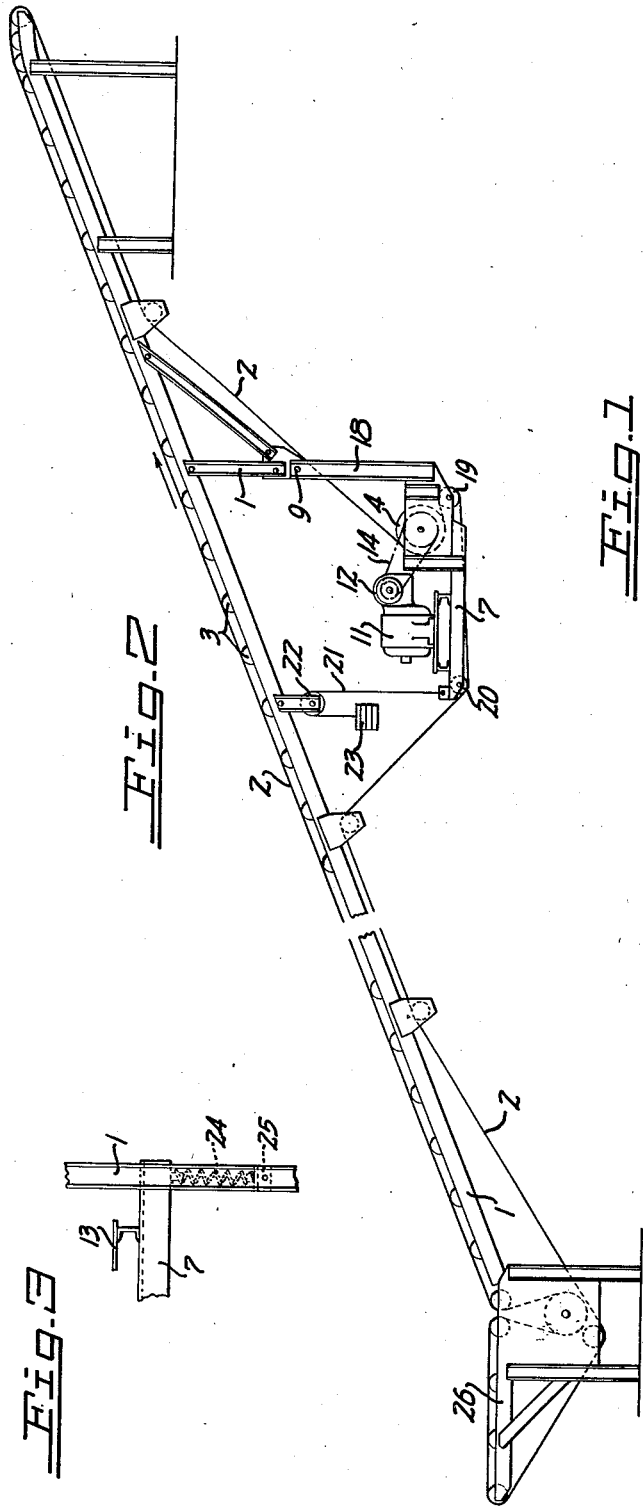
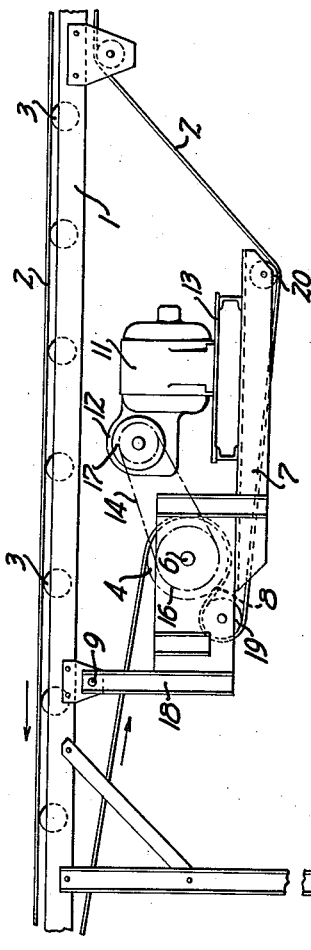
INVENTOR
HOWARD W. WYLIE
BY Charles S. Evans
HIS ATTORNEY

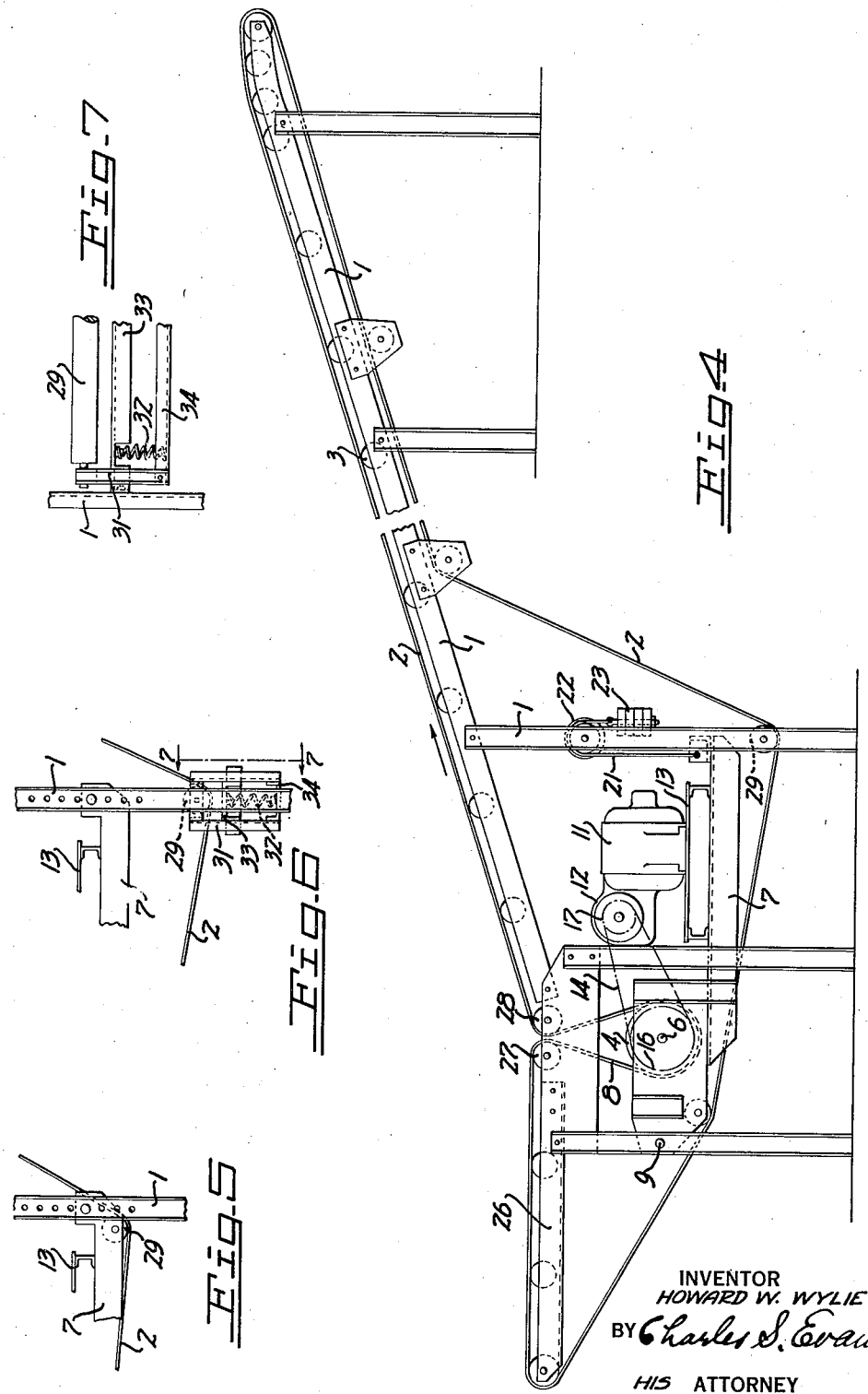

Patented June 4, 1940

2,202,882

UNITED STATES PATENT OFFICE 2,202,882

CONVEYER

Howard W. Wylie, Seattle, Wash., assignor to Mailler Searles, Inc., San Francisco, Calif., a corporation of California Application August 20, 1937, Serial No. 160,107

15 Claims. (Cl. 198—203)

My invention relates to conveyers, and particularly to an improved driving means therefor.

Among other objects, it is a purpose of my invention to provide an improved conveyer driving mechanism having its weight partially supported by the conveyer belt for automatically taking up slack and maintaining a proper driving tension therein.

Another object of my invention is to provide an improved driving mechanism for conveyer belts which may be conveniently applied to the belt at any desired point therealong, and which may be operated to drive the belt in either direction.

A further object is to provide a conveyer drive mechanism which will eliminate a number of parts heretofore regarded as necessary, and which will insure efficient operation under varying load conditions.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side elevational view of a conveyer and drive mechanism embodying my invention, portions being broken away.

Figure 2 is a diagrammatic elevational view of a modified arrangement of the drive mechanism of my invention, and illustrating its application to an inclined conveyer.

Figure 3 is a fragmental detail illustrating a modified means for partially balancing the weight of the driving means and support.

Figure 4 is a side elevational view of a modified arrangement of the conveyer and drive mechanism.

Figure 5 is a fragmental detail showing a modified arrangement of the belt guiding roller of Figure 4.

Figure 6 is a fragmental detail showing another modified means for mounting the guide roller of Figure 4.

Figure 7 is a fragmental view of the structure shown in Figure 6, viewed in the direction indicated.

In terms of broad inclusion, the conveyer of my invention comprises an endless belt having a bight thereof engaged by a driving pulley journalled upon a support movably mounted, preferably on a pivot, adjacent the belt. Driving means, preferably an electric motor, is mounted upon the support and connected to the drive pulley, the weight of the support and the belt driving means thereon being partially supported by the belt itself so as to take up slack in the belt and maintain a proper tension therein. Guide rollers are provided for directing the belt past the drive mechanism. Such rollers may be mounted upon the movable support so as to aid in taking up slack in the belt; or the rollers may be mounted on an independent fixed support, either in fixed position thereon or in connection with a movable support resiliently mounted in connection therewith.

The driving mechanism of my invention may be positioned at any desired point along the conveyer, either in the load carrying reach, or in the return reach; and may be operated to drive the conveyer belt in either direction.

My invention also contemplates the optional provision of means for counterbalancing a portion of the weight of the movable support and driving mechanism, so as to relieve the conveyer belt of a desired portion of the tensioning weight to which it would otherwise be subjected.

In the preferred embodiment, the motor support is pivoted at a point such that the tension in the reach of the conveyer belt approaching the drive pulley tends to turn the motor support in the same direction about its pivot as the weight of the motor. The position of the pivot point may be varied to vary the leverage through which the belt pull is effective for moving the support about its pivot; or, if desired, to partially offset the weight of the support and driving means.

In terms of greater detail, and referring particularly to the illustrative embodiments shown in the drawings, the conveyer of my invention comprises a suitable framework 1, and an endless conveyer belt 2 supported thereon for movement over suitable supporting and guiding means, such as rollers 3.

The belt 2 is driven by means of a drive pulley 4 journaled, as at 6, upon a movable support 7, and engaging a bight 8 formed in the belt. The support 7 is mounted for movement about a pivot axis 9, positioned near one end thereof. A suitable electric motor 11, equipped with appropriate speed reducing means 12, or other suitable driving means, is mounted upon a platform 13 carried by the support 7.

The motor 11 is connected to the drive pulley 4 by a suitable driving connection, as for example a belt 14, passing over pulleys 16 and 17 mounted in connection with the pulley 4 and the speed reducer 12 respectively. Other driving means, such as a chain and sprocket, or suitable gearing, may of course be substituted for the belt 14 and pulleys 16 and 17 if desired.

In the preferred arrangement, illustrated in Figure 1 of the drawings, the support 7 is mounted by means of an arm 18 extending upwardly to the pivot shaft 9. The pivot shaft 9 is preferably positioned at a point such that the belt, as it approaches the drive pulley 4, passes below the shaft. The belt 2 passes over guide rollers 19 and 20, mounted at opposite ends of the support 7, by which the belt is directed under the support. The weight of the support 7, and the driving means mounted thereon, is supported partially by the pivot shaft 9, and partially by the belt; and causes the support 7 to swing downwardly to take up slack from the belt, both in the bight 8, and in the length of belt passing under the guide roller 20.

By positioning the pivot shaft 9 at the end of the support nearest the delivery end of the conveyer, and above the line of pull of the belt, the load upon the tight side of the bight 8 also tends to swing the support about the pivot 9 in a direction such as to automatically take up slack in the belt and maintain an effective driving tension therein. The moment due to the pull of the belt may be varied to suit the requirements of any particular installation by varying the distance between the pivot 9 and the line of pull of the belt, thereby varying the leverage through which the belt force is effective.

If desired, the pivot shaft 9, may be positioned below the line of pull of the belt 2 as it approaches the drive pulley 4. In that case, the moment due to the belt pull will be opposed to the moment due to the weight of the support and driving means, so that only a portion of the weight will be effective for maintaining tension in the belt. By positioning the pivot axis in the plane of the tight side of the bight 8, the pull of the belt will have no tendency to turn the support about its pivot; and only the weight of the support and driving means will be effective for maintaining tension in the belt.

In order to relieve the belt of a load exceeding that required to take up slack and maintain a proper tension thereon, a counter-balance may be mounted in connection with the free end of the support for counter-balancing a desired portion of the load carried by the drive support 7. The counter-balance may conveniently comprise one or more ropes or cables 21 passing over a pulley or pulleys 22 mounted on the frame 1 of the conveyer. One end of each cable 21 is connected to the free end of the support 7, and the other end is arranged to carry a suitable counter-weight 23. The counter-weight 23 preferably comprises a plurality of separable bodies the number of which may be increased or decreased to obtain a desired total weight.

Other counter-balancing means, as for example a spring, arranged to carry a desired portion of the weight of the support and driving means, may be used in place of the counter-weight. Figure 3 illustrates such an arrangement, the outer or free end of the support 7 being partially supported by one or more compression springs 24 mounted in any convenient manner between the end of the support 7 and a fixed support 25.

Figure 4 illustrates a modified arrangement which is particularly adapted for use in connection with inclined conveyers carrying objects supplied thereon by a gravity feed. In this arrangement, a short horizontal section 26 of the conveyer, at the bottom of the inclined section, receives the object from the gravity feed mechanism; and serves to propel the object onto the inclined load carrying reach of the conveyer.

In this modification the bight 8 of the belt 2, engaged by the pulley 4, extends downwardly between guide rollers 27 and 28 defining the adjacent ends of the horizontal and inclined portions respectively of the conveyer. The free end of the support 7 is suspended upon the bight 8; and serves to automatically take up slack in the belt, by lengthening the bight 8, as the support is swung downwardly about its pivot, due to the weight of the support and driving means.

In this arrangement the drive pulley 4 is preferably mounted with its axis directly below and in vertical alignment with the narrow opening between the guide rollers 27 and 28; and the pivot 9 is preferably placed in approximately the same horizontal plane as the axis of the pulley 4 when the support is in a substantially horizontal position. This arrangement permits the weight of the motor to be effective through a maximum leverage; and obtains the maximum amount of take up in the belt for a given movement of the support 7.

In the arrangement shown in Figure 4, a guide roller 29 is mounted upon the frame 1, instead of the roller 20 upon the support 7 as shown in Figures 1 and 2, thereby causing all of the slack to be taken up in the bight 8. However, the roller 29 may be positioned upon the support 7, as illustrated in Figure 5.

If desired, the roller 29 may be resiliently mounted upon the frame 1. Figures 6 and 7 illustrate such an arrangement, the roller 29 being mounted upon a yoke 31 movably mounted upon the conveyer frame 1. A compression spring 32 is mounted at each end of the roller, between a fixed abutment 33 upon the frame 1, and a cross bar 34 forming a part of the yoke, for resiliently absorbing sudden loads imposed upon the conveyer belt.

The driving mechanism illustrated in Figure 4 may be similarly arranged at any desired point along the length of the belt 2, either in the load carrying reach, or in the return reach of the belt. Thus, a bight, corresponding to the bight 8, may be formed at any desired point along the belt by carrying a loop of the belt downwardly between appropriately spaced rollers mounted at the selected point. The drive mechanism is then mounted with the drive pulley 4 engaging such bight for driving the conveyer at the desired point.

Any lengthening of the belt, due to stretching, is automatically taken up by the movement of the support 7 about its pivot, thereby maintaining a proper driving tension. At the same time, any momentary lag or slackening of the belt, due to varying load conditions, is compensated for by a movement of the support 7 such as to automatically restore equilibrium, and maintain a steady driving tension.

Since the belt 2 is maintained in tension along the entire length, the drive mechanism of my invention may be operated to drive the conveyer belt in either direction. Thus, where it has heretofore been common practice to place the drive at the discharge end of the conveyer so as to exert a direct pull upon the loaded reach of the conveyer, the drive mechanism of my present invention is equally effective when placed at the loading end of the conveyers; or at any point, intermediate the ends of the conveyer, in connection with either the load carrying or the return reaches of the conveyer.

Only a single drive pulley 4 is necessary. The cost of one or more additional drive pulleys, bearings, and drive connections therefor, such as heretofore commonly used, is therefore obviated by the use of the drive mechanism of my invention. In addition, the excessive wear on the belt resulting from any inaccuracy in the size and/or rate of drive of the pulleys in a plural drive pulley arrangement is eliminated. Moreover, in the plural drive pulley arrangements heretofore commonly used, the extreme accuracy of pulley size and rate of drive has necessitated the use of parts which are costly because of the extremely accurate machine work necessary in their manufacture. Such accuracy is not necessary in the drive mechanism of my invention, and hence I am able to effect a substantial saving in the cost of manufacture and installation.

While I have illustrated and described my invention as applied to a conveyer of the flat belt type, the device is of course equally applicable to conveyers of other types such as those in which the load carrying member comprises a rope, cable, or link structure; and the term belt, as used throughout the present specification and claims, is inclusive of such structures.

I claim:

1. A conveyer comprising an endless belt having a bight formed therein, a drive pulley engaging the bight, driving means connected to the pulley, a pivotally mounted support for the pulley and driving means, and guide means for directing the belt under the support, the support and driving means being movable to automatically take up slack in the belt.

2. A conveyer comprising an endless belt having a bight formed therein, a drive pulley engaging the bight, driving means connected to the pulley, a support for the driving means and pulley, the support and driving means being movable to automatically take up slack in the belt, guide means upon the support for directing the belt under the support, and means for partially counter-balancing the support and driving means.

3. A conveyer comprising an endless belt having a bight formed therein, a drive pulley engaging the bight, driving means connected to the pulley, and a pivoted support for the pulley and driving means partially supported by the bight and movable to vary the tension in the belt, the pivot point of the support being so positioned that the pull of the belt and the weight of the driving means will tend to move the support in a belt tightening direction.

4. A conveyer comprising an endless belt having a bight formed therein, a drive pulley engaging the bight, driving means connected to the pulley, a pivoted support for the pulley and driving means partially supported by the bight and movable to vary the tension in the belt, the pivot point of the support being so positioned that the pull of the belt and the weight of the driving means will tend to move the support in a belt tightening direction, and means for varying the force applied through the support for tightening the belt.

5. A conveyer comprising an endless belt having a load carrying reach and a return reach, a drive support mounted for pivotal movement, driving means upon the support, and a drive pulley actuated by the driving means and engaging a bight formed in the belt, the support being pivoted at a point such that the pull of the belt tends to turn the support in a belt tightening direction.

6. A conveyer comprising an endless belt having a load carrying reach and a return reach, a drive support mounted for pivotal movement, driving means upon the support, and a drive pulley actuated by the driving means and engaging a bight formed in the belt, the support being pivoted at a point such that the pull of the belt and the weight of the driving means combine to turn the support in a belt tightening direction.

7. A conveyer comprising an endless belt having a load carrying reach and a return reach, a support pivotally movable about a pivot positioned adjacent the end of the support nearest the delivery end of the conveyer, driving means upon the support, a pulley actuated by the driving means, and a bight in the return reach engaging the pulley, the tight side of the bight being directed to the pulley along a plane passing below the pivot.

8. A conveyer comprising an endless belt having a load carrying reach and a return reach, a support pivotally movable about a pivot positioned adjacent the end of the support nearest the delivery end of the conveyer, driving means upon the support, a pulley actuated by the driving means, a bight in the return reach engaging the pulley, the tight side of the bight being directed to the pulley along a plane passing below the pivot, and guides for directing the return reach past the support.

9. A conveyer comprising an endless belt having a load carrying reach and a return reach, a support pivotally movable about a pivot positioned adjacent the end of the support nearest the delivery end of the conveyer, driving means upon the support, a pulley actuated by the driving means, a bight in the return reach engaging the pulley, the tight side of the bight being directed to the pulley along a plane passing below the pivot, and guides adjacent the ends of the support for directing the return reach thereunder.

10. A conveyer comprising an endless belt having a load carrying reach and a return reach, a support pivotally movable about a pivot positioned adjacent the end of the support nearest the delivery end of the conveyer, driving means upon the support, a pulley actuated by the driving means, a bight in the return reach engaging the pulley, the tight side of the bight being directed to the pulley along a plane passing below the pivot, and guides upon the support adjacent its ends for directing the return reach thereunder, the support being movable about its pivot mounting under the combined influence of the weight of the driving means and the pull of the belt upon the drive pulley for automatically taking up slack from the belt.

11. A conveyer comprising an endless belt having two load-carrying reaches arranged in oblique angular relation with one reach arranged to deliver a load carried thereon onto the other, a bight formed in the belt between the adjacent ends of said reaches, a driving pulley within the bight, driving means connected to the pulley, and a support for the pulley and driving means movable by gravity to maintain tension in the belt.

12. A conveyer comprising an endless belt having two load-carrying reaches arranged in oblique angular relation with one reach arranged to deliver a load carried thereon onto the other, a bight formed in the belt between the adjacent ends of said reaches, a driving pulley within the bight, driving means connected to the pulley, a pivoted support for said pulley and driving means movable by gravity to maintain tension in the belt, and means partially counterbalancing the support and driving means.

13. A conveyer comprising an endless belt having a bight formed therein, a support movably mounted adjacent the bight, a drive pulley upon the support engaging the bight and suspending one end of the support therefrom, driving means mounted on the support and connected to the pulley, and guide means upon the support and movable therewith for directing the belt past the support.

14. A conveyer comprising a frame having guide rollers journaled thereon, an endless belt on the pulleys, a motor for driving the belt, supporting means for the motor adjustably disposed on the frame to vary the tension in the belt, a driving pulley journaled on the supporting means and connected to the motor, a bight in the endless belt passing around the driving pulley, and resilient means for mounting one of the guide rollers.

15. A conveyer comprising an endless belt having two load carrying reaches one of which is arranged to deliver a load carried thereon onto the other, a pair of idler guide rollers mounted in spaced parallel relation at the adjacent ends of the two reaches, a drive pulley mounted in spaced parallel relation to the idler rollers, a bight of the belt extended between the idler pulleys and around the drive pulley, and driving means connected to the drive pulley, said drive pulley and driving means being movable for varying the length of the bight to automatically take up and pay out slack in the load carrying reaches in accordance with variations in the loads thereon.

HOWARD W. WYLIE.